United States Patent [19]

Torikoshi

[11] Patent Number: 5,397,823
[45] Date of Patent: Mar. 14, 1995

[54] FUNCTIONAL FILM-FORMING PASTE COMPOSITION AND PROCESS FOR FORMING FUNCTIONAL FILM

[75] Inventor: Kaoru Torikoshi, Minami Ashigara, Japan

[73] Assignee: Fuji Xerox Co., Ltd., Tokyo, Japan

[21] Appl. No.: 116,973

[22] Filed: Sep. 7, 1993

[30] Foreign Application Priority Data

Sep. 9, 1992 [JP] Japan .................... 4-265608

[51] Int. Cl.⁶ .................... C08K 5/52; C08K 5/04; C08K 5/09; H01B 1/20
[52] U.S. Cl. .................... 524/140; 524/174; 524/284; 524/297; 524/300; 524/322; 524/398; 524/400; 106/243; 252/511; 252/518
[58] Field of Search .............. 524/145, 174, 176, 284, 524/297, 322, 398, 399, 434, 400, 140; 106/243; 252/511, 518

[56] References Cited

U.S. PATENT DOCUMENTS

| | | | |
|---|---|---|---|
| 3,682,853 | 8/1972 | Barie, Jr. et al. | 524/399 |
| 3,951,882 | 4/1976 | Markhart et al. | 524/176 |
| 4,423,182 | 12/1983 | Bartman | 524/399 |
| 4,886,551 | 12/1989 | Fink et al. | 106/243 |
| 5,021,489 | 6/1991 | Knight et al. | 524/145 |

FOREIGN PATENT DOCUMENTS 3019826 1/1988 Japan .
1666498 7/1991 U.S.S.R. .

*Primary Examiner*—Tae H. Yoon
*Attorney, Agent, or Firm*—Oliff & Berridge

[57] ABSTRACT

A functional film-forming paste composition is disclosed, comprising (a) at least one metal-containing organic compound and at least one of (b) an acrylic resin, (c) an unsaturated fatty acid, and (d) an organic acid ester or phosphoric ester, the components (a) to (d) being dissolved in an organic solvent. The paste composition can be calcined at a low temperature, undergoes no change with time, can be printed by any printing method, exhibits good adhesion to a substrate, and gives a film free from unevenness in thickness and from defects such as cracks and pinholes.

6 Claims, No Drawings

FUNCTIONAL FILM-FORMING PASTE COMPOSITION AND PROCESS FOR FORMING FUNCTIONAL FILM

FIELD OF THE INVENTION

This invention relates to a paste composition for forming a functional film, such as a resistive film, a transparent conductive film, a fluorescent film, a magnetic film, a ferroelectric film, an electrochromic film or a photochromic film, and a process for forming a functional film using the same.

BACKGROUND OF THE INVENTION

It is known that a functional thin film can be formed by coating or printing a film-forming paste on a substrate followed by calcination. This film forming process is advantageous in that no special equipment is required and that a thin film of relatively large area can be prepared with ease. A resistive film of a thermal head, a transparent conductive film, etc. have been produced by this process. For example, a resistive film of a thermal head can be formed by applying a paste composition prepared by dispersing a powder mixture of ruthenium oxide and glass frit in an organic vehicle consisting of a solvent and a resin to a substrate by screen printing followed by calcination as disclosed, e.g., in JP-A-53-100496 and JP-A-54-119695 (the term "JP-A" as used herein means an "unexamined published Japanese patent application"). The paste composition used here must be heated to a high temperature around 800° C. in order to fuse glass frit, etc. and to improve adhesion to a substrate.

A paste composition comprising an metal-containing organic compound capable of becoming a transparent conductive metal oxide on calcination, an organic solvent, a resin, and a subliming pigment has been proposed as a paste with improved screen printability for forming a transparent conductive film as disclosed in JP-A-59-18769.

Thus, the conventional functional films have been formed by using a paste composition containing specific additives designed for the particular use. That is, a general-purpose paste composition which is broadly applicable to various types of functional films is unknown.

A paste composition for forming a functional film is required (i) to exhibit satisfactory adhesion to a substrate, (ii) to be applied by any printing method, (iii) to provide a film having uniformity in thickness and composition and no defects such as cracks and pinholes, and (iv) to be able of being calcined at a relatively low temperature so as to broaden the choice of material for a substrate. It is also required to undergo no change of itself with time.

For the time being, a paste composition satisfying all of these requirements is unknown, and it has been keenly demanded to develop an improved paste composition.

On the other hand, the optimum viscosity of a film-forming paste composition is subject to variation according to a desired film thickness or a printing or coating method adopted. Conventionally employed resins for viscosity adjustment include cellulose resins, e.g., ethyl cellulose and nitrocellulose, and butyral resins. However, since ethyl cellulose and a butyral resin not only have a high thermal decomposition temperature but hardly decompose completely, a paste composition containing these resins needs a high calcining temperature. This narrows the choice of substrate material on which a functional film can be formed. Further, a transparent conductive film prepared from a paste composition containing these resins suffers from reductions in performance properties, such as conductivity. To the contrary, nitrocellulose has a low thermal decomposition temperature and completely decomposes at a low temperature. However, nitrocellulose is difficult to handle due to its own explosiveness and is also less available.

SUMMARY OF THE INVENTION

An object of the present invention is to provide a functional film-forming paste composition which can be calcined at a low temperature, which undergoes no change with time, which can be printed by any printing method, which exhibits good adhesion to a substrate, and which gives a film free from unevenness in thickness and from defects such as cracks and pinholes.

Another object of the present invention is to provide a functional film forming process which is applicable to a variety of end uses, such as a resistive film, a transparent conductive film, a fluorescent film, a magnetic film, a ferroelectric film, an electrochromic film, and a photochromic film.

As a result of extensive investigations, the present inventors have found that use of an acrylic resin in place of the conventional resins for viscosity adjustment provides a paste composition which can be calcined at a low temperature and meets a demand for a desired viscosity over a broad range. The present invention has been completed based on this finding.

The present invention relates to a functional film-forming paste composition comprising (a) at least one metal-containing organic compound and at least one additive selected from (b) an acrylic resin, (c) an unsaturated fatty acid, and (d) an ester compound selected from an organic acid ester and a phosphoric ester, the components (a) to (d) being dissolved in an organic solvent.

The present invention also relates to a process for forming a functional film comprising printing or coating the above-mentioned paste composition on a substrate and calcining the coating film.

DETAILED DESCRIPTION OF THE INVENTION

The metal-containing organic compound which can be used as component (a) may be any of known kinds conventionally employed for functional films. Examples of suitable metal-containing organic compound include metal alkoxides, fatty acid metal salts (e.g., 2-ethylhexanoic acid metal salts), metal naphthenates, acetylacetonatometals, and so forth. Component (a) is appropriately selected from these metal-containing organic compound according to the end use of the functional film.

For example, metal-containing organic compound capable of becoming conductive oxides on calcination, such as those containing a platinum group metal, e.g., Ru, Rh, Pd, Os, Ir, and Pt, can be used for production of a resistive film. If desired, the platinum group metal compound may be used in combination with one or more metal-containing organic compound capable of becoming insulating oxides on calcination, such as those containing a metal selected from Si, Bi, Pb, Sn, Al, B, Ti, Zr, Ca, and Ba.

Metal-containing organic compound containing In, Sn, Zn, Cd, Ti, etc. can be used for production of a transparent conductive film.

Metal-containing organic compound containing Ca, W, Ba, Si, Zn, Cd, P, Sr, Mg, As, Ge, Y, V, Ga, Pb, Mn, Ti, Sn, Eu, Er, Sm, Tm, Tb, Al, Nd, Ce, Bi, etc. can be used for production of a fluorescent film.

Metal-containing organic compound containing Fe, Co, Ba, Mn, Ni, Zn, Y, Mg, Gd, Sr, V, etc. can be used for production of a magnetic film.

Metal-containing organic compound containing Ti, Ba, Pb, La, Zr, Li, Ge, Zn, Sr, Mg, Ca, Ta, Nb, V, W, Mn, Cu, Ga, Al, etc. can be used for production of a ferroelectric film.

Metal-containing organic compound containing V, W, Ni, Mo, Ti, etc. can be used for production of an electrochromic film.

Metal-containing organic compound containing Ca, Ti, Ni, Mo, Pb, La, Zr, Fe, etc. can be used for production of a photochromic film.

As the specific metal-containing organic compound, compounds of carboxylate, diketone-type chelate compounds, alkoxide or mercaptide, etc., containing Ir, Rh, Pt, Pd, Os, and the like platinum metals and metal-containing organic compound or non-metal-containing organic compound compounds containing Si, Bi, Pb, Sn, Al, B, Ti, Zr, Ca and Ba are disclosed in U.S. application Ser. No. 07/844,856, Ir series metal-containing organic compound having specific structure are disclosed in U.S. application Ser. No. 07/844,853, and metal-containing organic compound containing Ru, Ir, Rh, Pt, Pb and Os are disclosed in U.S. application Ser. No. 07/841,465, and these compounds are preferably used in the present invention. Further, metal resinates which are commercially available from C. E. Chemchat Co. and Noritake Co., etc. are also suitably used in the present invention.

Component (b), an acrylic resin, is a vehicle component which functions to adjust the viscosity of the paste composition according to a desired film thickness or a printing method adopted. The acrylic resin completely decomposes at relatively low temperatures, i.e., 500° C. or lower, and is driven out of the system as $H_2O$, $CO_2$, without leaving impurities and without interfering with thermal decomposition of other components. Further, it is easily soluble in general-purpose organic solvents having a boiling point of 100° C. or higher. Furthermore, it suppresses abrupt thermal decomposition of the metal-containing organic compound contained in the paste composition when calcined. The acrylic resin can easily have its solubility in various solvents or its viscosity controlled by altering the chemical structure thereof or physical properties thereof, such as a degree of polymerization. Accordingly, use of the acrylic resin as an additive affords a paste composition which can be calcined at a reduced temperature while satisfying any viscosity requirement. As a result, a choice of material for a substrate will be broadened. For example, it has now been made possible to form a functional film on a heat-resistant polymer film comprising polyimide, etc. which could not be used as a substrate in conventional techniques.

The acrylic resin which can be used as component (b) in the present invention preferably includes polyacrylates and polymethacrylates. Specific examples of suitable polyacrylates are polymethyl acrylate, polyethyl acrylate, polypropyl acrylate, poly-n-butyl acrylate, polyisobutyl acrylate, poly-t-butyl acrylate, poly-n-hexyl acrylate, polyoctyl acrylate, poly-2-ethylhexyl acrylate, and polylauryl acrylate. Specific examples of suitable polymethacrylates are polymethyl methacrylate, polyethyl methacrylate, polypropyl methacrylate, poly-n-butyl methacrylate, polyisobutyl methacrylate, poly-t-butyl methacrylate, poly-n-hexyl methacrylate, polyoctyl methacrylate, poly-2-ethylhexyl methacrylate, polylauryl methacrylate, and polystearyl methacrylate. Among them, polymethyl methacrylate, polyethyl methacrylate, and polybutyl methacrylate are particularly preferred.

Component (c), an unsaturated fatty acid, functions to improve leveling of the paste composition to thereby form a film having uniform thickness. Further, it solidifies to some extent through thermal polymerization on drying thereby controlling excessive fluidity of the paste and bringing about markedly improved adhesion to a substrate. Furthermore, the unsaturated fatty acid exchange ligands with the abovementioned, metal-containing organic compound e.g. , a 2-ethylhexanoic acid metal salt, to make the metal-containing organic compound easily soluble in a solvent or to change the rheological behavior of the paste composition from rheopectic properties to thixotropic properties which are advantageous properties in screen printing.

When component (c) is used in combination with component (b), the effect of improving leveling and thereby improving thickness uniformity is enhanced. A paste composition, for example, a resistive film-forming paste composition, containing no unsaturated fatty acid tends to form a film showing large scatter of thickness, suffering from defects such as pinholes, and having poor adhesion to a substrate. A paste composition containing an unsaturated fatty acid but no acrylic resin tends to form a film which undergoes cracking on calcining.

The unsaturated fatty acid to be used in the present invention preferably includes those having a relatively high boiling point and being liquid at room temperature, such as those containing from 10 to 26 carbon atoms, e.g., oleic acid, linoleic acid, and linolenic acid.

Component (d), an ester compound selected from an organic acid ester and a phosphoric ester, acts as a high-boiling solvent which controls the rate of evaporation of the paste composition and also as a good solvent for the other components, such as an acrylic resin, to homogenize the paste composition. It is also effective to suppress abrupt thermal decomposition of the paste, which, in combination with the homogenizing effect, simplifies the pattern of thermal decomposition. Accordingly, in the presence of component (d), where component (a) comprises two or more, metal-containing organic compound, a uniform melt of different oxides is formed on calcination while avoiding formation of an oxide of a specific metal, thereby inhibiting formation of impurities (independent precipitates from each metal compound). If the paste composition does not contain component (d), the melt tends to exhibit complicated thermal decomposition peaks assigned to different materials, and each material will independently undergo thermal decomposition, leading to precipitation of impurities. In short, component (d) is effective in leveling the film thickness, reducing film defects such as pinholes, improving adhesion to a substrate, eliminating impurities after calcination, and improving stability of the paste composition. For example, a paste composition comprising (a) an metal-containing organic compound (b) an acrylic resin and (c) linoleic acid tends to form a film having many pinholes when observed under a scanning electron microscope. Such defects can be eliminated by addition of component (d).

The organic acid ester which can be used as component (d) include phthalic esters, aliphatic dibasic acid esters, and fatty acid esters. The organic acid esters include those known as a plasticizer or leveling agent of coatings, and preferably those derived from an organic acid, e.g., phthalic acid, and an aliphatic alcohol having from 4 to 8 carbon atoms.

Examples of suitable phthalic esters are dimethyl phthalate, diethyl phthalate, dibutyl phthalate, bis(2-ethylhexyl) phthalate, and dioctyl phthalate. Examples of suitable aliphatic dibasic acid esters include dioctyl adipate, diisodecyl adipate, dibutyl sebacate, and dioctyl sebacate. Examples of suitable fatty acid esters include dibutyl oleate, methyl acetylricinoleate, and butyl stearate.

The phosphoric ester which can be used as component (d) includes tricresyl phosphate, trioctyl phosphate, triphenyl phosphate, and trichloroethyl phosphate.

The amount of each of components (b), (c) and (d) may be selected appropriately. Generally, they are each added in an amount of from 0.2 to 2 parts by weight per part by weight of component (a).

The organic solvent which can be used for dissolving components (a) and at least one of components (b) to (d) includes aromatic hydrocarbons, e.g., toluene; alcohols, e.g., α-terpineol, 2-ethylhexanol, and benzyl alcohol; high-boiling esters, e.g., benzyl acetate, carbitol acetate, and dimethyl phthalate; high-boiling alcohol ethers, e.g., butyl cellosolve, carbitol, and butyl carbitol; and ethers, e.g., tetrahydrofuran.

Addition of components (b), (c) and (d) to component (a) provides a stable paste composition having a proper viscosity and showing no hysteresis. It is seen from analysis of the thermal decomposition behavior of the paste composition of the present invention that these three additives are each effective to suppress abrupt thermal decomposition of the paste, homogenize the material composition, reduce film defects, and make the film denser.

The paste composition comprising these components according to the present invention suffers from no change with time, can be printed by any printing method, exhibits satisfactory adhesion to a substrate, and can be calcined at a low temperature to provide a functional film with even thickness and free from defects such as cracks and pinholes.

The process for forming a functional film according to the present invention comprises printing or coating the above-mentioned functional film-forming paste composition on a substrate and calcining the coated or printed film.

Materials of the substrate which can be used in the present invention includes heat-resistant resins, e.g., polyimide, polyphenylene sulfide and polyamide; inorganic substances, e.g., alumina, borosilicate glass, alkali-free glass, quartz glass, PLZT, PZT, $BaTiO_3$, MgO, Si and GaAs; and metals, e.g., aluminum and stainless steel.

Printing or coating of the past composition on the substrate can be carried out by dip coating, wire bar coating, doctor blade coating, roll coating, spin coating, screen printing, and the like technique.

The printed or coated film formed by the printing or coating method is then calcined. In the calcination, an organic Substance component of the metal-containing organic compound is thermally decomposed and a solvent is evaporated and removed from the film.

Generally, a paste composition printed or coated on a substrate according to the present invention is introduced into an electric furnace such as a muffle furnace, a belt furnace and an infrared furnace for calcination, and heated to the thermal decomposition temperature of the composition or higher temperature.

In order to complete the thermal decomposition and stabilize the oxidized state of the calcined film, it is preferred that calcination is carried out at a temperature ranging from about 350° to 1500° C. for about 30 minutes or more, particularly about 30 minutes to 10 hours. Calcination can be carried out under a reducing atmosphere by introducing hydrogen, water vapor, etc., a reactive atmosphere of hydrogen sulfide or a reduced pressure.

Calcination of the paste composition can be effected at a temperature above the decomposition point of the metal-containing organic compound used. In order to cause complete thermal decomposition to thereby stabilize the oxidized state of the calcined film and to accelerate crystallization, a calcining temperature is preferably 350° C. or higher. The higher the temperature, the higher does the crystallinity result.

The thus prepared functional film exhibits satisfactory adhesion to a substrate, has a uniform-thickness, and is free from defects such as cracks and pinholes.

According to the process of the present invention, a multi-layer functional film composed of two or more layers having the same or different functions. Thus, the process greatly contributes to achievement of multifunctionality, high integrity, and high density in functional devices.

The present invention will now be illustrated in greater detail with reference to Examples. All the parts and percents are by weight unless otherwise indicated.

EXAMPLE 1

Production of Resistive Film

1) Preparation of Paste Composition:

One part of a mixture consisting of iridium 2-ethylhexanoate and bismuth 2-ethylhexanoate at an Ir to Bi atomic ratio of 1:2, 1 part of a 10% α-terpineol solution of polybutyl methacrylate ("Elvacite 2045" produced by Toray Du Pont Co., Ltd.), 1 part of linoleic acid, and 1 part of dioctyl phthalate were mixed to prepare a paste composition.

2) Formation of Resistive Film:

The resulting paste composition was coated on a polyimide film ("Kapton 100H" produced by Toray Du Pont Co., Ltd.) by wire bar coating and dried at 70° C. for 1 hour and then calcined in a muffle furnace at 400° C. for 1 hour to form a resistive film having a thickness of 0.2 μm. The resulting resistive element had a volume resistivity of 0.38 Ωcm as measured with a surface resistivity meter "MCP-T400" manufactured by Mitsubishi Petrochemical Co., Ltd.

The resistive film was crosswise cut, and the cut area was observed under a transmission electron microscope. It was confirmed that the film had a dense structure in which fine particles of 10 to 100 Å or smaller were deposited in layers. Surface observation under a scanning electron microscope revealed no substantial film defects.

Comprising fine particles as mentioned above, the resulting resistive film had such high adhesion to the substrate as not to be peeled in an adhesive tape test.

While a polyimide film was used as a heat resistant polymer substrate in this Example, the above paste composition and resistive film forming process can be applied to any kind of substrates which withstand temperatures around 350° C. for a short time.

The resistivity of the resistive film can be varied according to the end use by changing the compounding ratio of metals so that there can be produced various resistive films useful for a thermal head, an ink sheet for electric transfer, a planar resistive heat element, etc.

EXAMPLE 2

Production of Transparent Conductive Film

1) Preparation of Paste Composition:

One part of a mixture of indium 2-ethylhexanoate and tin 2-ethylhexanoate (tin content: 6 mol %), 1 part of a 10% tetrahydrofuran solution of polyethyl methacrylate, 1 part of linoleic acid, and 1 part of dibutyl phthalate were mixed to prepare a paste composition.

2) Formation of Transparent Conductive Film:

The resulting paste composition was coated on a glass substrate by wire bar coating and calcined in a muffle furnace at 600° C. for 1 hour to form a transparent conductive film having a thickness of 0.2 $\mu$m.

The resulting film had a visible light transmission of 95% or higher. The volume resistivity of the film was $8.7 \times 10^{-1}$ $\Omega$cm as measured with the same meter as used in Example 1. The film showed high uniformity with neither defects such as pinholes nor substantial scatter of resistivity in its plane.

Further, the paste composition was coated on a heat-resistant polymer film, such as a polyimide film, in the same manner as described above and calcined at a temperature not higher than the heat-resistant temperature of the polymer to form a transparent conductive film on the polymer substrate.

EXAMPLE 3

Production of Fluorescent Film

1) Preparation of Paste Composition:

One part of a mixture consisting of yttrium 2-ethylhexanoate and tris(pivaloyltrifluoroacetonato)europium at a Y to Eu atomic ratio of 1:0.03, 1 part of a 10% $\alpha$-terpineol solution of polybutyl methacrylate, 1 part of linoleic acid, and 1 part of bis(2-ethylhexyl) phthalate were mixed to prepare a paste composition.

2) Formation of Fluorescent Film:

The resulting paste composition was coated on a glass substrate by screen printing using a 150 to 400 mesh stainless steel screen and calcined in a muffle furnace at 600° C. for 1 hour to form a fluorescent film having a thickness of 0.2 $\mu$m.

When the resulting fluorescent film was excited by irradiating monochromatic light of 360 nm isolated from light emitted from a xenon lamp by means of an interference filter, emission of red light of 612 nm was observed. This emission seems attributed to transition of europium from $^5D_0$ to $^7F_2$.

EXAMPLE 4

Production of Magnetic Film

1) Preparation of Paste Composition:

One part of iron 2-ethylhexanoate, 1 part of a 10% tetrahydrofuran solution of polyethyl methacrylate, 1 part of linoleic acid, and 1 part of dioctyl phthalate were mixed to prepare a paste composition.

2) Formation of Magnetic Film:

The resulting paste composition was coated on a polyimide film ("Kapton 100H") by wire bar coating and dried at 100° C. for 1 hour and then calcined in a muffle furnace at 400° C. for 1 hour to form a magnetic film having a thickness of 0.2 $\mu$m.

The resulting magnetic film had a saturation magnetization of 23 emu/g in the magnetic field of 5 kOe as measured with a vibrating sample type magnetometer.

EXAMPLE 5

Production of Ferroelectric Film

1) Preparation of Paste Composition:

One part of a mixture consisting of lead 2-ethylhexanoate, lanthanum 2-ethylhexanoate, zirconium 2-ethylhexanoate, and titanium tetraisopropoxide at an atomic ratio of $Pb_{1-x}La_x(Zr_yTi_{1-y})_{1-x/4}$ ($x=0.09$, $y=0.65$), 1 part of a 10% $\alpha$-terpineol solution of polybutyl methacrylate, 1 part of linoleic acid, and 1 part of bis(2-ethylhexyl) phthalate were mixed to prepare a paste composition.

2) Formation of Ferroelectric Film:

The resulting paste composition was coated on an ITO glass substrate by spin coating and calcined in a muffle furnace at 600° C. for 1 hour. This operation was repeated three times to form a ferroelectric film having a thickness of 1 $\mu$m. Gold was deposited on the ferroelectric film by vacuum evaporation.

The resulting ferroelectric element had a specific inductive capacity of 300/1 kHz as measured with an impedance analyzer.

EXAMPLE 6

Production of Electrochromic Film

1) Preparation of Paste Composition:

A toluene solution of vanadium naphthenate (vanadium content: 2%) was concentrated to a viscous solution having a concentration of about 70%. To 1 part of the concentrated solution were added 1 part of a 10% $\alpha$-terpineol solution of polybutyl methacrylate, 1 part of linolenic acid, and 1 part of bis(2-ethylhexyl)phthalate to prepare a paste composition.

2) Formation of Electrochromic Film:

The resulting paste composition was coated on an ITO glass substrate by spin coating and calcined in a muffle furnace at 500° C. for 1 hour to form an electrochromic film having a thickness of 0.5 $\mu$m and comprising yellow $V_2O_5$.

The ITO glass substrate with the electrochromic film and another ITO glass substrate were assembled into a cell, and lithium perchlorate dissolved in propylene carbonate was injected therebetween as an electrolytic solution. The resulting electrochromic cell changed from pale yellow to gray on application of a direct current electric field. This change in hue was repeatedly observed with change of polarity.

EXAMPLE 7

Production of Photochromic Film

1) Preparation of Paste Composition:

Lead 2-ethylhexanoate, lanthanum 2-ethylhexanoate, zirconium2-ethylhexanoate, and titanium tetraisopropoxide were mixed at an atomic ratio of $Pb_{1-x}La_x(Zr_yTi_{1-y})_{1-x/4}$ ($x=0.09$, $y=0.50$), and iron 2-ethylhexanoate was added thereto in an amount of 0.3 mol % on an atomic basis. One part of the resulting mixture of metal-containing organic compound, 1 part of a 10% tetrahydrofuran solution of polyethyl methacrylate, 1 part of linoleic acid, and 1 part of bis(2-ethylhexyl) phthalate were mixed to prepare a paste composition.

2) Formation of Photochromic Film:

The resulting paste composition was coated on a glass substrate by wire bar coating and calcined in a muffle furnace at 600° C. for 1 hour to form a transparent photochromic film having a thickness of 0.5 μm.

The film turned to green on being irradiated with light of 360 nm. The green color disappeared on heating to 200° C.

The functional film-forming paste composition according to the present invention provides a functional film by a very simple process consisting of coating or printing on a substrate followed by calcining. Unlike the conventional paste compositions, there is no need to prepare different additives for different formulations designed for different functions. Besides, since the paste composition of the present invention can be calcined at lower temperatures than in the conventional processes, the choice of material of a substrate can be broadened, and a homogenous film free from defects such as cracks or pinholes and from scatter of material composition can be obtained. Therefore, the paste composition and process for forming a functional film according to the present invention are of great utility in the production of high-performance, multi-functional, highly integrated, and high-density devices.

While the invention has been described in detail and with reference to specific examples thereof, it will be apparent to one skilled in the art that various changes and modifications can be made therein without departing from the spirit and scope thereof.

What is claimed is:

1. A functional film-forming composition comprising (a) at least one metal-containing organic compound, (b) an acrylic resin, (c) an unsaturated fatty acid, and (d) an organic acid ester or phosphoric ester, the components (a) and at least one of components (b) to (d) being dissolved in an organic solvent selected from the group consisting of aromatic hydrocarbons, alcohol ethers and ethers.

2. A functional film-forming composition as claimed in claim 1, wherein said acrylic resin is a polyacrylate or a polymethacrylate.

3. A functional film-forming composition as claimed in claim 1, wherein said unsaturated fatty acid contains from 10 to 26 carbon atoms.

4. A functional film-forming composition as claimed in claim 1, wherein said organic acid ester is a phthalic ester, an aliphatic dibasic acid ester or a fatty acid ester.

5. The functional film-forming composition of claim 1, wherein components (b), (c) and (d) are present in an amount of 0.2 to 2 parts by weight per part by weight of component (a).

6. The functional film-forming composition of claim 1, wherein component (a) is a compound selected from the group consisting of metal alkoxides, fatty acid metal salts, metal naphthenates and acetylacetonatometals.

* * * * *